United States Patent [19]

Donnelly

[11] 3,834,663
[45] Sept. 10, 1974

[54] METAL SEAT BUTTERFLY VALVE
[75] Inventor: James F. Donnelly, Leicester, Mass.
[73] Assignee: Jamesbury Corp., Worcester, Mass.
[22] Filed: Dec. 9, 1971
[21] Appl. No.: 206,337

[52] U.S. Cl. ............................... 251/173, 251/306
[51] Int. Cl. ............................................. F16k 1/22
[58] Field of Search ........... 251/170, 171, 172, 173, 251/174, 306

[56] References Cited
UNITED STATES PATENTS

| | | | |
|---|---|---|---|
| 3,077,331 | 2/1963 | Burtis | 251/173 |
| 3,077,332 | 2/1963 | Burtis | 251/173 |
| 3,153,427 | 10/1964 | Burtis | 251/174 X |
| 3,185,436 | 5/1965 | Bovang | 251/172 |
| 3,273,855 | 9/1966 | Wells | 251/172 X |
| 3,394,915 | 7/1968 | Gachot | 251/174 |
| 3,550,906 | 12/1970 | Mayers | 251/173 X |
| 3,591,133 | 7/1971 | Miles | 251/173 |
| 3,658,292 | 4/1972 | Takigawa | 251/173 X |

FOREIGN PATENTS OR APPLICATIONS
383,104    12/1964    Switzerland.......................... 251/174

Primary Examiner—Harold W. Weakley
Attorney, Agent, or Firm—Robert C. Miller

[57] ABSTRACT

Disclosed is a butterfly valve particularly adapted for service with high pressure and high temperature fluids, and fluids containing suspended solids such as slurries. A butterfly valve is provided with a metal seat ring having a curved metal lip that is adapted to contact the peripheral surface of the valve disc. The metal seat has a configuration that enables fluid pressure from one side of the valve to enhance the sealing effectiveness of the valve. The lip of the seat is positioned to provide an interference fit with the periphery of the disc when the valve is closed, so that the valve is capable of sealing fluid from either side of the disc over a portion of the pressure rating of the valve.

2 Claims, 3 Drawing Figures

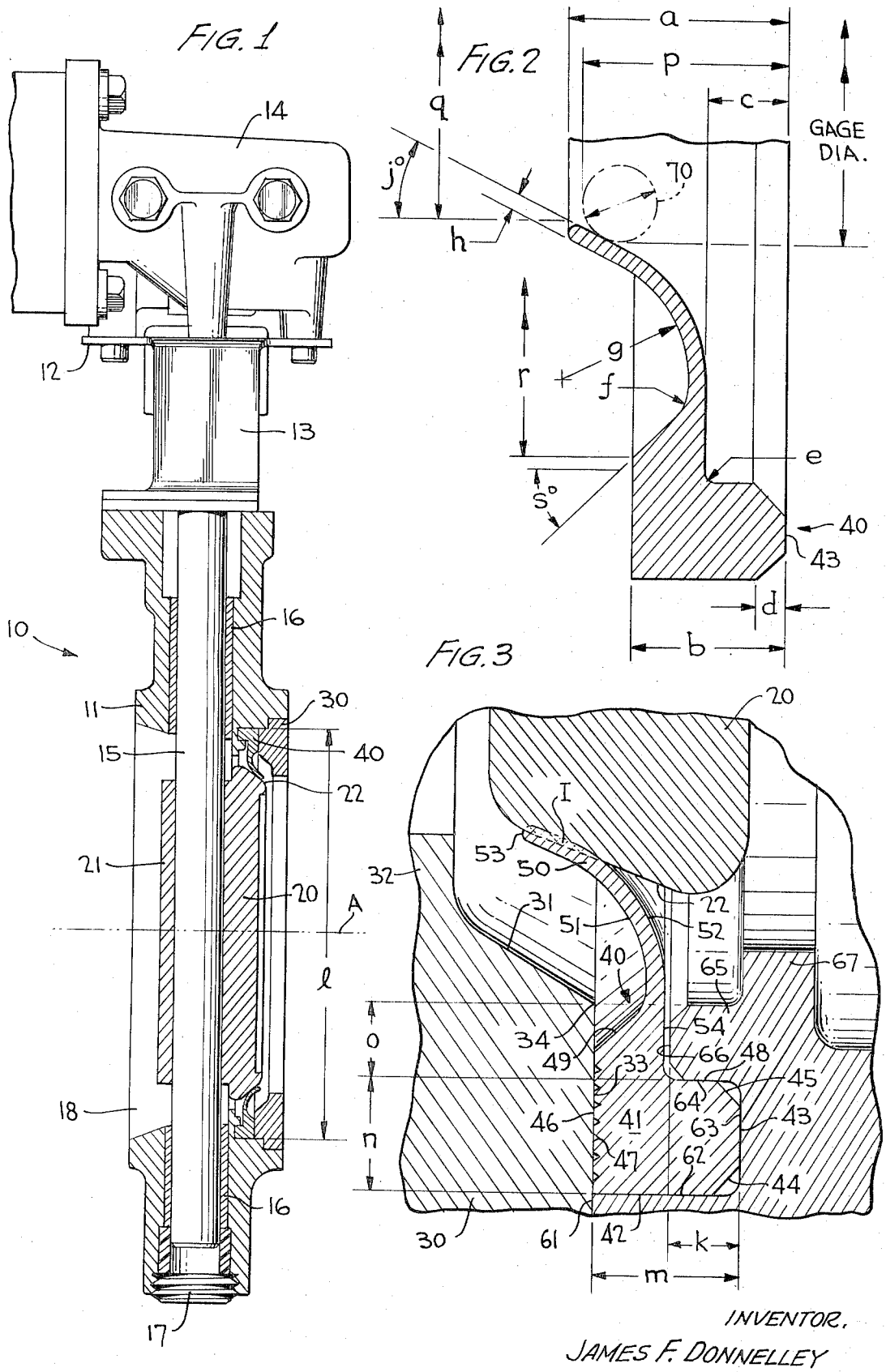

METAL SEAT BUTTERFLY VALVE

CROSS REFERENCE TO RELATED APPLICATIONS

This application is related to U.S. Pat. application Ser. No. 158,699, filed July 1, 1971, for "Cryogenic Butterfly Valve" by Michael E. Miles and James F. Donnelly; and U.S. Pat. application Ser. No. 732,729, filed May 28, 1968, for "Butterfly Valve Seat" by David A. Helman, Michael E. Miles and James F. Donnelly, now allowed; and U.S. Pat. No. 3,591,133, issued July 6, 1971, for "Butterfly Valve" by Michael E. Miles and James F. Donnelly.

BACKGROUND OF THE INVENTION

This invention relates to rotary fluid control valves of the butterfly valve type. Many of these valves have a circular fluid flow channel therethrough and a circular disc mounted for rotation between an open position, in which the disc lies substantially parallel to the axis of the fluid flow channel through the valve, and a closed position in which the disc lies perpendicular to this axis. The disc edge contacts an annular seat circumscribing the fluid flow channel, when the valve is in the closed position, and the sealing contact between these members will shut off fluid flow through the channel.

When a butterfly valve of the type just described is employed in applications wherein the fluid to be controlled is a high temperature-high pressure fluid and/or a fluid containing suspended solids such as slurries, many criteria must be met in order to assure an acceptable sealing action between the disc and the seat. High pressures subject the valve components to extreme stress and strain. High temperature liquids will cause the various components of the valve to thermally expand when the liquid comes in contact with those components. Slurries and fluids with solid matter suspended therein create problems in valve wear because the suspended particles exert an abrasive action on the various valve components.

A desirable feature in butterfly valves is the ability to shut off liquid flow coming from either side of the disc. Many existing butterfly valves are unidirectional, i.e., only one side of the valve may face the upstream side of the flow line if sealing efficiency is to be maintained. It is, of course, desirable for the valve to be capable of shutting off and controlling fluid flow regardless of the direction from which the fluid pressure is applied to the valve.

Another desirable feature in butterfly valves is the ability to enhance the sealing effectiveness of the valve by means of the pressure exerted against the disc and seat components by the fluid being controlled. Many existing butterfly valves have seat configurations that cannot take advantage of the forces generated by the line pressure when the valve is closed.

It is an object of the present invention to provide a butterfly valve suitable for service with high pressure-high temperature fluids and with fluids containing suspended solids such as slurries, yet provide a simple structure with improved sealing characteristics.

It is another object of the present invention to provide a butterfly valve capable of providing positive sealing action regardless of the direction in which fluid is approaching the valve, at least over a portion of the pressure range capabilities designed into the valve.

Other objects will be apparent from a consideration of this disclosure.

SUMMARY OF THE INVENTION

The butterfly valve of this invention is of a type wherein the butterfly disc element is mounted on a shaft for rotation about an axis perpendicular to the axis of the fluid flow channel. The butterfly disc has a flange or gudgeon extending from one planar surface thereof and the shaft passes through and is attached to this flange so that the disc edge will form an unbroken sealing surface circumscribing the entire circumference of the disc. The annular seat member circumscribes the fluid flow channel and is located so that it will cooperate with the disc sealing surface when the valve disc is closed.

The just-described eccentric mounting of the disc on the shaft allows the sealing surface in the disc edge to completely lift off of the resilient seat after a relatively small rotation of the shaft. For butterfly valves in high temperature service, it is important to note that when the valve is in the open position, the high temperature fluid is passing through the valve and exposing all parts of the valve to the extreme heat of the fluid. If the edge of the open disc was contacting the seat at two different locations (usually the top and bottom of the seat when the valve is in its common position) these locations would not be fully exposed to the hot fluid and could undergo a different degree of expansion than the rest of the seat. In such an instance, when the disc would be rotated to a closed position to shut off the flow of the liquid, these locations on the seat may not properly mate with the sealing surface on the disc and a leakage path could be established. Thus, it can be seen that the total absence of contact between the seat ring and the open disc is a definite advantage when the valve is used in high temperature service.

The bearings between the valve housing and the disc shaft should be a material that is capable of withstanding exposure to the high temperature fluids. An example of such a material would be a bearing of glass-fiber-filled Teflon (polytetrafluroethylene), mechanically bonded to a stainless steel backing or, alternatively, a high temperature stainless steel bearing.

A groove is provided in the valve housing for the seat ring. The groove may be the space formed between facing surfaces of two elements, one element being the valve housing itself and another element being a metal retaining ring that fits into a recess formed in the housing. One side of the groove has a projection or a lug extending, when seen in cross section, in a direction parallel to the longitudinal axis of the flow channel of the valve. The other side of the groove is substantially smooth, as is the surface forming the bottom face of the groove. This latter surface may be referred to, as seen in cross section, as the bottom of the seat ring groove. The seat groove will extend a full 360° around the interior of the valve housing. The sealing surface on the disc is an unbroken circular surface because the shaft is offset from the sealing surface on the disc and consequently the seat ring will have a sealing surface that extends a full 360° around the interior of the valve housing. Both the valve housing and the metal retaining ring may have projections formed thereon that project radially inward toward the fluid flow axis. The projections would thus be located on either side of the seat ring yet would be short enough to permit the disc to be rotated about the shaft. These projections disrupt fluid flow during the opening and closing of the valve disc and thereby protect the seat ring itself from some of the abrasive effects of suspended solids in the fluid being controlled.

The seat engaging surface formed on the outer edge of the disc is a portion or a segment of a converging surface and the convergence occurs at a point on the extension of the fluid flow axis. For example, the circumscribing sealing surface on the edge of the disc may be a frustum of a cone or a segment of a sphere or a spheroid.

It should be noted that the means employed to fasten the valve disc to the valve shaft should pass through the flange or gudgeon on the disc in a direction parallel to the plane of the face of the disc. In other words, fastening pins or similar fastening means should not pass perpendicularly through the face of the disc and create the danger of a leakage path through the disc when the valve is closed.

The seat ring employed in the valve of the present invention must be of a material that is able to maintain its sealing contact with the periphery of the disc when exposed to fluids at high temperatures and pressures. Additionally, the seat must be erosion resistant when the fluid to be controlled is a slurry with suspended solids such as coal dust, paper pulp, and the like. Such a material may be 316 stainless steel coated by an organo-metallic fusion process to impart high lubricity and extreme hardness to the surface. Such a coating will prevent galling of the metal seat by contact with the disc and also materially improve the erosion resistant properties of the seat.

The seat ring itself must have an outside diameter of a size that will fit in the previously discussed groove formed in the housing.

The portion of the seat ring that fits in the groove may be referred to as the heel of the seat and the thickness of this heel portion should slightly exceed the width of the groove formed in the valve housing. In this manner the seal ring will be gripped by the side walls of the groove when the valve is assembled — the metal retaining ring will press against one side of the seat ring heel and the surface of the groove that is formed in the housing itself will press against the other side of the seat ring heel. The side of the seat ring facing the metal retaining ring may have a plurality of concentric serrations formed thereon. When viewed in cross section, these serrations appear as V-shaped grooves, and materially improve the fluid seal between the seat ring and the valve housing.

The heel of the seat ring should be shaped to have a portion of the seat ring that will cooperate with the previously mentioned lug in the valve housing. In this manner, the seat ring will be securely gripped in the proper position in the valve housing and will be able to withstand stresses exerted thereon by high temperature and high pressure fluids.

The sealing ring has a curved lip that is adapted to cooperate with the circumferential sealing surface on the valve disc. The lip curves so it converges in the same direction as the peripheral sealing surface on the edge of the valve disc. The dimensions of the seat lip and the peripheral edge of the disc are controlled to insure an interference fit between the valve disc and the lip of the seat when the valve is closed. This interference fit assures a preloaded fit between seat and disc and thus increases the force of the seat lip pressing against the disc edge. This feature permits the valve of the present invention to be used with fluids flowing in either direction in the flow line, at least over the lower portion of the design pressure range of the valve. Thus this valve may be employed in high temperature applications with fluid flow in either direction if the pressure is below a given limit of, for example, 100 PSI.

For higher pressure applications such as 100 PSI to 500 PSI, best results are obtained if the valve is used in applications that involve the application of fluid pressure from only one direction. This direction is from the previously mentioned point of convergence toward the valve disc so that the metal lip is pressure biased into the peripheral surface of the valve disc.

Further features of the invention will be apparent from a consideration of the detailed description of a preferred embodiment of our butterfly valve and a consideration of the accompanying drawing.

It should be noted that although the discussion above has been directed to a butterfly valve, other rotary valves such as a ball valve may also employ the teachings of the instant invention.

BRIEF DESCRIPTION OF THE DRAWING

FIG. 1 is an elevation view, partially in cross section, of the butterfly valve of the instant invention.

FIG. 2 is a cross sectional representation of a portion of the annular seat ring employed in the valve of the instant invention.

FIG. 3 is a cross sectional view of the portions of the valve housing, the valve seat ring and the valve disc as they are related to each other when the valve is in the closed position.

DESCRIPTION OF A PREFERRED EMBODIMENT

FIG. 1 illustrates a butterfly valve indicated generally by the numeral 10. This valve has a housing 11 with a bonnet 12 attached thereto by connecting member 13. A powered valve operator 14 is shown attached to bonnet 12 although it is to be understood that the details of the valve actuating mechanism are not relevant to this invention.

Shaft 15 passes through appropriate bearings 16 in the valve housing and must also be of a length that will permit one end of the shaft to be associated with valve actuator 14. The other end of the shaft extends through a lower bearing hole in valve housing 11 and this hole is closed by plug 17.

Butterfly disc 20 is attached to shaft 15 in an offset of eccentric manner by means of a gudgeon or flange 21 extending from one planar surface of the disc. Not only is the shaft mounted to be offset from the plane of the disc but it is also offset from a diameter of the disc. Such nondiametric mounting of the disc for rotation is especially desirable where the circumferential sealing surface of the disc is a portion of a converging surface. Appropriate limit stops (not shown) would be provided in the housing to prevent a rotation of the disc or more than 90°.

Suitable fastening means such as pins (not shown) may pass through flange 21 and shaft 15 but the pins should be in a plane parallel to the face of the disc rather than perpendicular to the face of the disc so that no holes are formed through the disc. Fastening holes passing through the face of the disc create potential leak paths when the disc is closed and consequently are to be avoided.

A converging sealing surface 22 circumscribes the butterfly disc and converges, as seen in FIG. 1, towards a point to the right of the disc that is located on an extension of the axis A of the flow path passing through the valve.

Seat ring 40 is positioned in a groove in housing 11 in a manner to be described more completely below and presents a sealing face that cooperates with face 22 on disc 20.

A groove is provided in the valve housing for the seat ring 40. This groove may be the space formed between facing surfaces of a portion of valve housing 11 and a portion of a metal ring 30 that fits into a specially formed recess in housing 11.

FIG. 3 illustrates an enlarged cross sectional view of seat 40 installed in the seat receiving groove in the valve housing and in contact with sealing surface 22 of butterfly disc 20.

The seat receiving groove is formed by the space between metal retaining ring 30 and surfaces formed in portion 60 of valve housing 11. Ring 30, with particular reference to FIG. 3, has vertical face 33 that merges into an upper inclined surface 31 which itself terminates in a projection 32.

Valve body portion 60 has surface 61 formed thereon to mate with surface 33 when the valve is assembled. With reference to FIG. 3, portion 60 has formed thereon horizontal surface 62 which constitutes the bottom surface of the seat ring groove, vertical surface 63; and horizontal surface 64. This latter surface constitutes the bottom wall of lug 65 and this lug, when viewed in cross section, extends parallel with the flow axis of the valve and in a direction toward metal retaining ring 30. Surface 66 of lug 65 is the vertical surface of the lug closest to metal ring 30.

Portion 60 of valve body 11 has projection 67 formed thereon that extends into the flow channel of the valve. Both projections 32 and 67 are short enough to permit disc 20 to be rotated past them during opening and closing of the valve. During initial opening or closing of the valve to a throttling position, projections 32 and 67 provide an erosion-resistant surface that cooperates with disc surface 22. Thus, when the fluid is throttled between the projections and the sealing surface of the disc, the fluid flow is disrupted before it strikes the seat with full impact and this feature protects the seat ring from some of the abrasive effects of suspended solids in the fluid being controlled.

Seat ring 40 has a heel portion 41 and a lip portion 50. Heel portion 41, with reference to FIG. 3, is bounded by vertical surface 46, horizontal surface 42, vertical surface 43 and horizontal surface 48. These surfaces are in contact with previously described surfaces 33, 62, 63 and 64, respectively, when the valve is assembled. Surface 43 is relieved at 44 and 45 to facilitate the insertion of the seat ring into the groove in portion 60 of the valve body. Concentric serrations 47 may be formed on surface 46 of the seat heel to facilitate the fluid seal between surfaces 46 and 33. As is apparent from an inspection of FIG. 3, lug 65 serves to lock seat ring 40 in the groove when the valve is assembled.

Lip portion 50 extends into the flow channel of the valve and curves so that it extends in the same direction as the convergence of surface 22. This enables surface 52 of lip 50 to sealingly engage the peripheral sealing surface of the disc. Sealing surface 52 of lip 50 is dimensioned in a manner to engage surface 22 so that an interference fit I is established when the seat ring is installed in the groove. This interference fit is indicated in FIG. 3 by the letter I, but it is to be understood that the pressure of surface 22 of the disc against surface 52 of lip 50 will cause a bending of the lip in a direction toward surface 31 when the valve is assembled. The natural resilience of the bent lip will exert a force against the disc that increases the sealing ability of the valve. Such a seat can be considered to be a preloaded seat and it is preloaded against the disc. It will, at least over a pressure range of, for example, less than 100 PSI, enable the valve to be used in applications where fluid pressure is applied against the disc from the right side of the valve (FIG. 2) as well as applications where the fluid pressure is applied from the left.

Lip 50 has a surface 51 facing to the left (FIG. 3) that presents a fluid biasing area to fluid in the flow channel. When pressure is applied to the left side of the disc (FIG. 3), the force applied against surface 51 tends to bias lip 50 into surface 22 of the disc and in this manner the valve may employ line pressure to increase contact pressure between the disc and the seat. This feature enables the valve to be employed in applications where fluid pressure is applied to the left side of the valve in a higher range than the previously mentioned 100 PSI example. It has been found that the seat will perform satisfactorily in a pressure range of 0 PSI to 500 PSI when the pressure is applied from the left side of the valve as viewed in FIG. 3.

Lip 50 is joined to heel 41 by a tapered linking seat portion that is bounded by inclined wall 49 and vertical wall 54. It is to be noted that a clearance is provided between vertical wall 54 and the facing wall 66 of lug 65. This clearance provides a space to allow the lip to be displaced somewhat to the right (FIG. 2) when high pressures are applied against surface 51, and thus allows the lip to follow the disc when the disc itself is displaced downstream by high pressures.

The tapered linking portion of the seat further facilitates flexure of lip 50.

The particular portion of surface 52 that contacts peripheral sealing edge 22 actually varies somewhat as pressures and temperatures change in the various applications in which the valve may be used. As for example, a relatively high pressure applied against surface 51 of lip 50 will force a greater portion of surface 52 against surface 22 than a relatively low pressure. As such, the lip of the seat ring will retain a fluid tight seal because its disc contacting surface is position compensating over the entire pressure and temperature design range of the valve, and a smooth surface of the seat lip will be applied to the peripheral edge of the disc during sealing engagement therewith.

EXAMPLE

The valve body 11 may be formed of 316 stainless steel or carbon steel and the disc 20 may be formed of 316 stainless steel. The shaft 15 may be formed from a high strength stainless steel. The seat ring 40 may be formed of 316 stainless steel and the shaft bearings may be formed of high temperature stainless steel or a glass filled Telfon mechanically bonded to a stainless steel backing. The shaft seals may be formed of the same glass filled Teflon. Seat retaining ring 30 is also formed of 316 stainless steel.

Appropriate dimensions for a butterfly valve commonly referred to as an 8 inch butterfly valve will be discussed with reference to the dimensions indicated by lowercase letters on FIGS. 2 and 3.

Dimension a, commonly referred to as the height of the seat is 0.343 inches; dimension b, commonly referred to as the height of the heel, is 0.260 inches; and dimension c is 0.138 inches. The edge at d is broken 0.05 inches × 45° and the corresponding edge on the inside of the seat heel is broken the same amount. The radius at e is 0.03, the radius at f is 0.06 and the radius at g is 0.22, all in inches. The thickness h of the lip is 0.030 inches and angle j is 26°.

The outside diameter of the entire ring is 8.605 inches and, of course, the diameter of the seat groove in the valve housing is slightly larger so that the seat ring may fit within the groove. For example, the groove diameter may be 8.615 inches. This diameter is indicated by the letter 1 in FIG. 1. The diameter of the inside of the ring, measured from tip to tip on the lip, is indicated by the letter q on FIG. 2 and may be 7.438 inches. The diameter indicated by the letter r in FIG. 2 may be 8.235 inches and angle s may be 45°.

The width of the lug formed in the valve housing is indicated by the letter o in FIG. 3 and is 0.125 inches. The distance between the lug and the bottom wall of the seat groove is indicated by the letter n and is 0.188 inches. The height of the valve housing lug (letter k in FIG. 3) is 0.132 inches and the width of the seat receiving groove (letter m in FIG. 3) is nominally somewhat less than the previously mentioned heel height so that the metal seat ring will be gripped therein. The width of the groove may be 0.250 inches.

The disc used in the above discussed 8 inch butterfly valve had a converging surface with an angle of 74° (as measured 90° displaced from the plane of the seat angle) and a major diameter (ring side of disc in FIG. 3) of 7.625 inches. With particular reference to FIG. 3, interference I is 0.015 inches and is assured by controlling the corresponding disc and lip diameters in the region of contact so that the disc is slightly larger than the lip. The overlapping portion of the disc and lip shown in FIG. 3 is intended to illustrate the interference fit but it is to be understood that when the valve disc is closed, the lip is actually displaced and exerts a pre-loaded force upon the disc periphery. It is understood, of course, that different angles and diameters may be employed depending on design requirements.

In a leakage test performed with an 8 inch butterfly valve of the present invention, the maximum leakage of air was found to be 20 standard cubic feet per hour (SCFH) at a pressure of 250 PSI and a temperature range of 0° to 500°. The flow capacity of the 8 inch butterfly valve in full open position is 2,100 gallons of water per minute at 1 pound per square inch pressure drop across the valve. This can be compared with a typical seatless butterfly valve which has a defined flow coefficient of 3 for the closed position of the valve. This means the valve will leak 3 gallons per minute with a 1 pound pressure drop across the valve.

A convenient method by which production seats may be inspected for dimensional accuracy without the calculation of the trigonometry of the seat angles is performed with a gauge diameter test device or tool. The seat is placed in a frame or collet with the seat lip pointing in a downward direction and a gauge tool is set across the seat and in contact with the upper surface 43 of the seat. The gauge tool has attached thereto a ring 70 (FIG. 2) that is a fixed distance from the surface of the gauge tool that contacts surface 43 of the seat. The outer diameter of ring 70, designated as the gauge diameter in FIG. 2, is a standard value of 7.460 inches and, if the dimensions of the production seat are accurate and true, ring 70 will contact the surface of the seat ring at a depth indicated by the letter p in FIG. 2 of 0.350 inches. The cross sectional diameter of the portion of the ring 70 visible in FIG. 2 is 0.125 inches.

On the basis of this disclosure of the invention, that which I claim is:

1. A butterfly valve comprising a valve housing with a flow channel passing therethrough,
    a valve disc rotatably mounted in said housing with a sealing surface circumscribing the periphery of said disc, said sealing surface being a portion of a converging surface,
    a metal annular seat means disposed to cooperate with said sealing surface to interrupt flow through said valve when said disc is rotated into the closed position,
    said seat means having a lip portion, a heel portion and a linking seat portion joining said lip portion to said heel portion,
    said valve housing having a recess adapted to receive a seat retaining means such that a seat receiving groove is formed between facing surfaces of said recess and said retaining means,
    one of said facing surfaces, when viewed in cross section, having lug means projecting toward the other of said facing surfaces,
    said seat means being positioned in said groove such that said heel portion of said seat is gripped in a fluid tight relationship between portions of said facing surfaces and said lug means contacts said heel portion to lock said heel portion against movement in said groove,
    said lip portion extending into said flow channel in the same direction as said converging surface and positioned to be preloaded against said converging surface when said valve is closed and being capable of flexure under the influence of temperature and pressure induced forces, and
    said lug means having that portion that is closest to said other of said facing surfaces being spaced from said seat to further facilitate flexure of said lip.

2. The valve of claim 1 including a projection on both said valve housing and said seat retaining means, each extending into said flow channel adjacent said disc and at a distance sufficient to provide protection to said seat means from erosion yet permit rotation of said disc past said projections.

* * * * *